Oct. 20, 1970   J. H. JOHANSEN ET AL   3,534,929
AIRCRAFT LAUNCHING DEVICE

Filed Feb. 20, 1969   2 Sheets-Sheet 1

INVENTORS
JOHN H. JOHANSEN
HARRY C. RIBLETT JR.
BY Meyer, Tilberry & Body
ATTORNEYS.

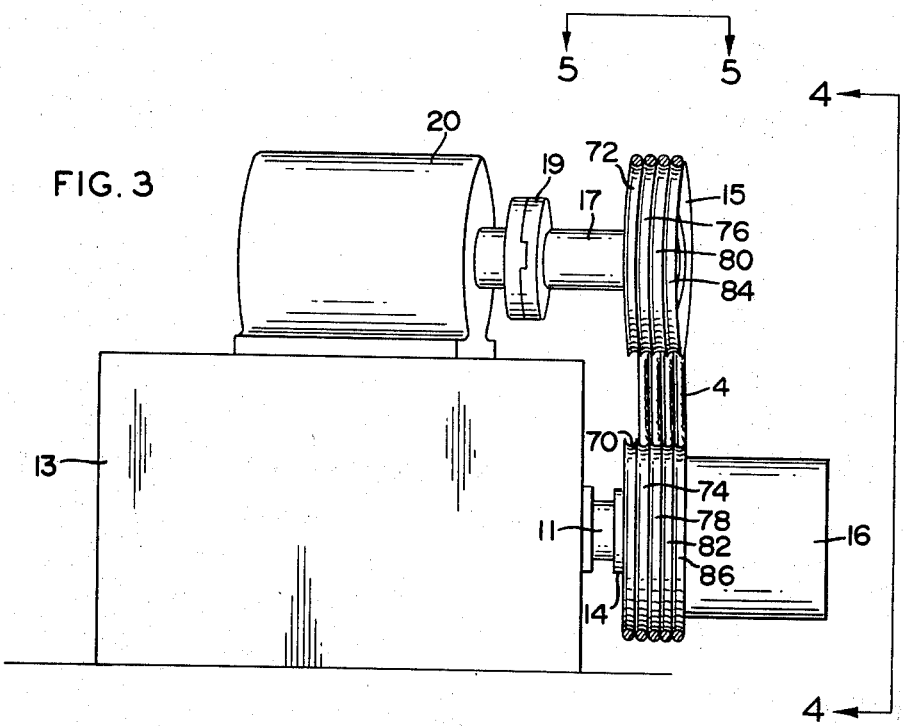
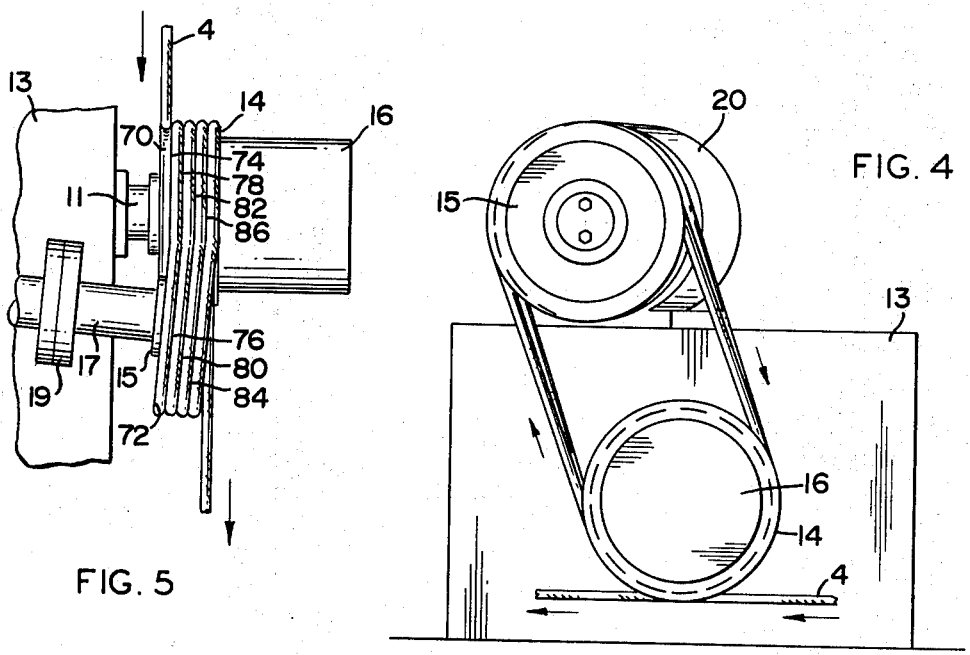

United States Patent Office 3,534,929
Patented Oct. 20, 1970

3,534,929
AIRCRAFT LAUNCHING DEVICE
John H. Johansen, Wallingford, Pa., and Harry C. Riblett, Jr., Wilmington, Del., assignors, by mesne assignments, to Gulf + Western Industrial Products Company, Grand Rapids, Mich., a corporation of Delaware
Continuation-in-part of application Ser. No. 591,511, Nov. 2, 1966. This application Feb. 20, 1969, Ser. No. 801,134
Int. Cl. B64f 1/08
U.S. Cl. 244—63       11 Claims

ABSTRACT OF THE DISCLOSURE

An aircraft launching device installed at an elongated aircraft runway includes a cable extending longitudinally of the runway from a prelaunch position to a launch position. A tape reel is positioned substantially midway between the prelaunch and launch positions adjacent the runway. An elongated flat fabric tape has one end connected to the reel and its other end connected with a portion of the cable which extends laterally of the runway around a sheave. The tape extends parallel to the runway in a straight line from the reel to its connection with the cable. The tape may be selectively connectable with the cable at either the prelaunch or launch positions for launching aircraft in two directions. Braking means is provided to stop movement of the cable in either direction at the end of a launch. Brake means is provided to stop rotation of the reel. Retract means is provided to return the cable to a prelaunch position and to unwind the tape from the reel. Tension compensating means is provided to hold the cable taut as it elongates during launching and braking periods.

---

This application is a continuation-in-part of U.S. patent application Ser. No. 591,511 filed Nov. 2, 1966, now abandoned.

This invention relates to the art of vehicle accelerating systems, and more particularly to an improved aircraft launching device.

The present invention is particularly applicable to the launching or catapulting of an aircraft, and will be decsribed with particular reference thereto. However, it will be appreciated that the invention has broader applications and may be used in various other vehicle accelerating systems.

One of the popular systems for catapulting aircraft involves the use of an aircraft-engaging dolly propelled by a moving cable formed into a continuous loop. One reach of the cable loop is installed on the center line of the runway and the other reach, located off the runway, is operatively associated with a clutch-engaged driving means for moving the cable around the loop.

The continuous loop system of the prior art disadvantageously possesses high inertia due to the fact that the driving means is operatively connected to the cable itself. Consequently, the driving means must develop sufficient torque to impart a linear velocity to the cable which is equal to the aricraft launch velocity. This imposes high energy output demands on the driving means and high energy absorbing demands on the braking means used to stop the cable at the end of the launch stroke. One system of this type is generally described in U.S. Pat. 3,392,937 to Riblett.

This disadvantage of the prior art system has been overcome by the present invention which is directed to an aircraft launching device of improved design, which possesses less inertia than the prior art system and therefore imposes lower demands on the power generating and power absorbing components of the system.

Other prior systems have utilized a flat elongated fabric tape coilable on a rotatable reel for launching an aircraft. Such arrangements are disclosed in U.S. Pats. 3,142,458; 3,220,216; and 3,228,630 to Byrne et al. The advantages of the coilable tape system are fully described in the Byrne patents. However, one disadvantage of prior coilable tape systems is that the tape was trained around pulleys and sheaves and also extended out onto a runway. In such arrangements, the fabric tape deteriorates very rapidly due to flexing and rubbing around pulleys and sheaves. In addition, that portion of the tape extending out onto a runway frequently makes contact with the runway while the tape is moving at very high speed. Only momentary contact with a highly abrasive runway often causes failure of the fabric tape so that the entire tape must be replaced. This is highly dangerous because abraded spots may go undetected. In addition, constant inspection of the tape is required and this time consuming operation is very expensive. In addition, replacement of the tape is also very expensive.

Therefore, it would be desirable to have a launching system which retains the advantages of the coilable tape while eliminating its disadvantages. In one arrangement, the system of the present invention includes a power driven rotatable tape reel positioned adjacent a runway substantially midway between a prelaunch and a launch position. In this arrangement, an elongated flat fabric tape is wound upon the reel in every-increasing convolutions so that the linear velocity of the free end of the tape increases as the convolutions become larger. In the present arrangement, the tape extends outwardly from the reel in a substantially straight line parallel to the runway and is not trained over any pulleys or sheaves. Therefore, flexing and abrading of the tape is avoided while maintaining the tape advantages of stretchability and automatic speed increase. In addition, the tape does not extend out onto a runway where it may be run over by aircraft or other vehicles and caused to oscillate during an aircraft launch so that it is abraded against a runway. More specifically, the present invention provides a cable extending longitudinally on the runway between prelaunch and launch positions. Such a cable is less likely to be damaged by aircraft passing over it or to fail by abrasion. In addition, failure of the cable makes it much easier and less expensive to replace as compared to prior arrangements which required replacement of the tape. In the present arrangement, the cable is trained around a pulley or sheave at the launch position on the runway and extends laterally of the runway to a connection with the tape. An aircraft towing means, such as a dolly, is attached to the cable on the runway and coiling of the tape on the reel moves the cable and towing means longitudinally of the runway from the prelaunch position to the launch position.

In a preferred arrangement of the present invention, the cable also extends laterally of the runway around a sheave at the prelaunch position. Adjacent the prelaunch position, a braking means is provided for retarding movement of the cable. Therefore, when the towing means is rapidly moved from the prelaunch position to the launch position, the braking means is applied to the cable rearwardly of the towing means so that movement of the towing means is stopped. In addition, retract means is provided adjacent the prelaunch position for pulling the cable and towing means from the launch position back to the prelaunch position. This retract means also automatically uncoils the tape from the reel to make the system ready for another launch.

In one arrangement of the present invention, the tape is connectable with the cable adjacent either the prelaunch or launch positions. In this manner, the cable and towing means may be moved from either the prelaunch positions. In this manner, the cable and towing means may be moved from either the prelaunch position to the launch position or from the launch position to the prelaunch position for bi-directional aircraft launching capability. In such an arrangement, braking means and retract means are provided for the cable adjacent both the prelaunch and launch positions. Therefore, aircraft may be launched in two directions by utilizing a single reel and tape. In a further arrangement, the tape is connected with the cable by movement multiplying means so that the rate of movement of the cable and towing means is a multiple of the linear rate of movement of the tape. With such an arrangement, the length of tape required is substantially reduced and the speed of the towing means is substantially increased without the need of an expensive transmission.

In accordance with a preferred arrangement, pretensioning means is provided for the cable at both the prelaunch and launch positions. During a launch, that portion of the cable forward of the towing means is placed under great tension and elongates. If this elongation were not taken up in some manner the cable might come off from a pulley or sheave. Therefore, a pretensioning cylinder is provided adjacent the prelaunch position and takes up any slack in the system due to elongation during launch. Likewise, braking of the towing means at the end of a launch places that portion of the cable to the rear of the towing means under tension and causes elongation. Therefore, an additional pretensioning cylinder is provided adjacent the launch position to take up elongation in the system caused during a braking period.

In accordance with the present invention there is provided, in a runway installed vehicle launching device, comprising a dolly operative for movement along a runway from an upstream, battery position, to a downstream, launch position, improved means to move the dolly comprising; a first and a second elongated, flexible, linear element, the first element having one end operatively connected to the upstream end of the dolly, the second element having one end operatively connected to the downstream end of the dolly, each of the elements having its respective other end operatively connected to stationary anchoring means, a first moveable sheave means having the first linear element reeved thereabout, a second movable sheave means having the second linear element reeved thereabout, means interconnecting the movable sheave means, and means operative to linearly move the second movable sheave means, whereby an incremental linear movement in the second movable sheave provides twice the incremental linear movement in the dolly.

It is therefore an object of the invention to provide an improved vehicle accelerating device which obviates certain disadvantages of prior art systems.

A further object of the invention is to provide an improved vehicle device which possesses less inertia than the prior art systems and therefore imposes lower demands on the power generating and power absorbing components of the system.

It is an additional object of the invention to provide an aircraft launching system which utilizes the advantages of a flat elongated tape wound in ever-increasing convolutions upon a reel while eliminating the disadvantages of tape failure due to contact with a runway and abrading against pulleys or sheaves.

It is another object of the present invention to provide such a launching system having bi-directional launching capability while utilizing only one tape reel.

It is also an object of the present invention to provide such a system with pretensioning means for maintaining a cable taut when it elongates both during launching and braking.

These and other objects and advantages will become apparent from the following detailed description of a preferred embodiment of the invention when read in connection with the accompanying drawings, in which:

FIG. 3 is a side elevational view looking in the direction of arrows 3—3 of FIG. 1;

FIG. 4 s a side elevational view taken in the direction of arrows 4—4 of FIG. 3; and FIG. 5 is a top plane view looking in the direction of arrows 5—5 of FIG. 3.

Figure 1:
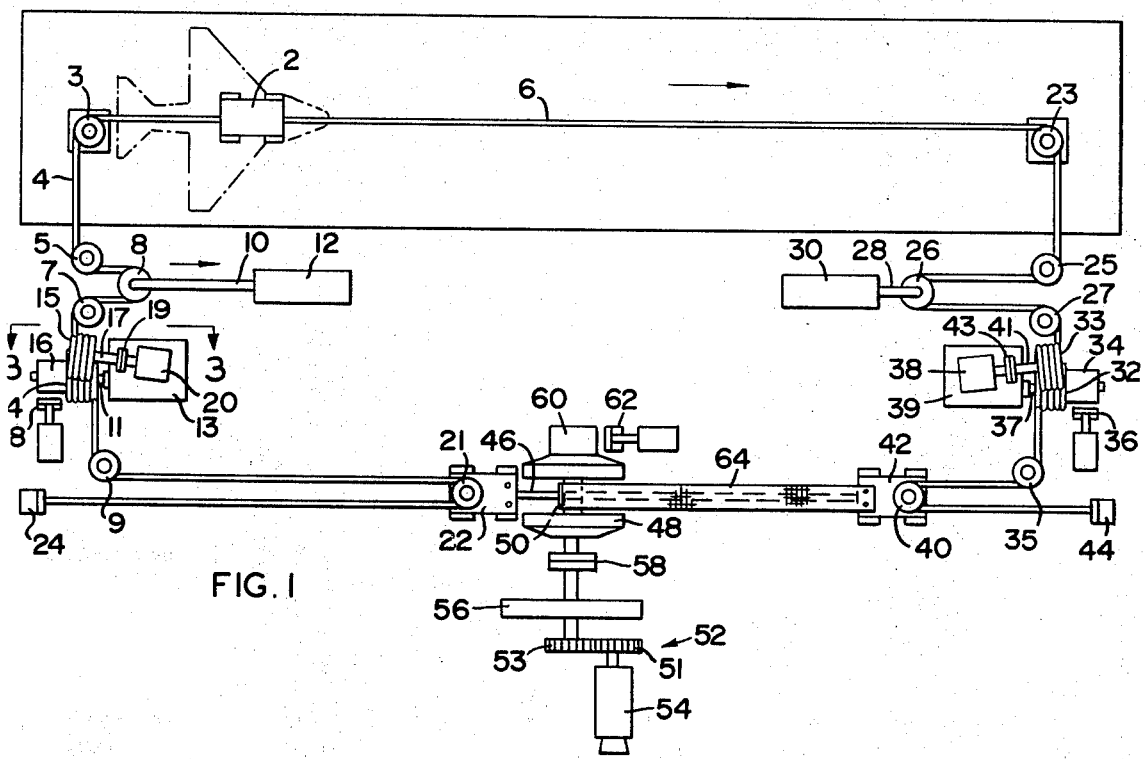
FIG. 1 is a diagrammatic top view showing the general organization of parts in a prelaunch configuration.
Figure 2:
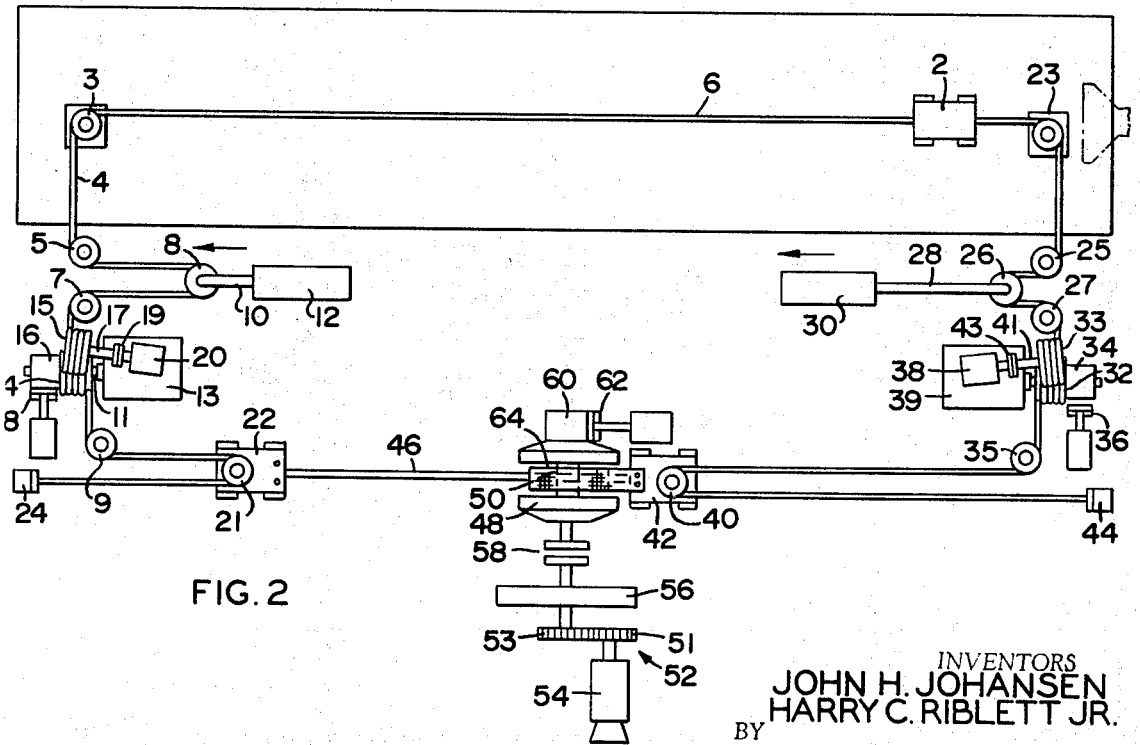
FIG. 2 is a diagrammatic top view showing the general organization of parts in a postlaunch configuration.

Referring now to the drawings wherein the showings are for purposes of illustrating a preferred embodiment of the invention only and not for the purpose of limiting the same, FIG. 1, shows a runway installed aircraft launching device comprising an aircraft engaging and towing means in the form of a wheeled dolly 2. Dolly 2 is adapted to move along the runway from a prelaunch, upstream, battery position, shown in FIG. 1, to a downstream, launch position as shown in FIG. 2. Engaging the upstream end of towing means or dolly 2 is one end of an elongated flexible linear element or cable 4 which is guided around stationary sheaves 3 and 5 into enagagement with tensioning sheave 8, and then around another stationary sheave 7 into engagment with multiple groove sheaves 14 and 15, which, together with brake drum 16 and brake shoe 18, form an arresting mechanism for the linear element. Linear element 4 continues around another stationary sheave 9, forming a loop around moveable sheave 21, and then terminating in stationary anchor 24.

Tensioning sheave 8 is operative for movement by connection to piston rod 10 which in turn is connected to a piston (not shown), movable within hydraulic cylinder 12 in response to the application of hydraulic pressure to the cylinder. In the prelaunch configuration shown in FIG. 1, linear element 4 is maintained under tension by the application of hydraulic pressure in a manner to cause piston rod 10 to move to the right as shown in FIG. 1.

Multiple groove sheave 15 is connected to retract engine 20. This engine remains inoperative during the launch phase, and is used only as an optional auxiliary means for returning the dolly from a launch position to a battery position. In the prelaunch configuration shown in FIG. 1, brake shoe 18 is disengaged from brake drum 16 and retract engine 20 is disengaged, so that multiple groove sheaves 14 and 15 are operative to free wheel.

In a preferred arrangement, sheave 14 has a shaft 11 rotatably journaled to support 13 on a substantially horizontal axis. Retract engine or motor 20 may be positioned on top support 13 and have its power shaft 17 selectively drivingly connected with sheave 15 through selectively engageable clutch 19.

Engaging the downstream end of dolly 2 is one end of an elongated flexible linear element or cable 6 which is guided around stationary sheaves 23 and 25 into engagement with tensioning sheave 26 and then around another stationary sheave 27 into engagement with multiple groove sheaves 32 and 33 which, together with brake drum 34 and brake shoe 36, form an arresting mechanism for the linear element. Thus drum and brake shoe functions as part of the device's bi-directional launching capability as will be described more fully hereinafter. Linear element 6 then continues around another stationary sheave, forming a loop around movable sheave 40 and then terminating in stationary anchor 44.

Tensioning sheave 26 is operative for movement by connection to piston rod 28, which in turn is connected to a piston (not shown) movable within hydraulic cylinder 30. In the prelaunch configuration shown in FIG. 1, the linear elements are maintained under tension with piston rod 28 in an inserted position with respect to hydraulic cylinder 30 and piston rod 10 in an extended position with respect to hydraulic cylinder 12.

Multiple groove sheave 33 is operatively connected to retract engine 38. This engine remains inoperative during the launch phase and is used only as a means for returning dolly 2 from a launch position to a battery position. In the prelaunch configuration shown in FIG. 1, brake shoe 36 is disengaged from brake drum 34 and retract engine 38 is disengaged so that multiple groove sheaves 32 and 33 are operative to free wheel.

In a preferred arrangement, sheave 32 has a shaft 37 rotatably journaled to support 39 on a substantially horizontal axis. Retract engine or motor 38 may be positioned on top of support 39 and have its power shaft 41 selectively drivingly connected with sheave 33 through selectively engageable clutch 43.

Movable sheaves 21 and 40 are adapted for movement by connection to wheeled trucks 22 and 42 respectively. The wheeled trucks are interconnected for simultaneous movement by member 46 which may take the form of a flexible cable or an inflexible rod.

The driving mechanism for trucks 22 and 42 comprises reel 48 mounted for rotation on hub 50, together with a drive train designated generally as 52. The drive train includes turbine engine 54 drivingly connected through gears 51 and 53 with energy storing flywheel 56 and clutch 58. Means for stopping the rotation of reel 48 include integrally mounted brake drums 60 and a brake shoe 62.

Movement of the linear elements 4 and 6 is effected by a belt 64 coilable and uncoilable on reel 48. One end of the belt 64 is connected to hub 50 and the other end is connected to truck 42 which carries movable sheave 40. As the belt 64 is coiled upon hub 50 of reel 48, truck 42 is caused to move to the left as shown in FIG. 1. Through the interconnection of linear element 6 with dolly 2, and dolly 2 with linear element 4, as truck 42 moves to the left, truck 22 is caused to move to the left as the same linear velocity. In view of the fact that the linear elements are reeved about their respective movable sheaves 21 and 40, an incremental linear movement in the trucks 22 and 42 will result in twice the incremental movement in dolly 2. That is, the linear rate of movement of tape 64 is multiplied, through its connection by sheave or pulley 40 to cable 6, so that the rate of movement of dolly 2 is a multiple of the linear rate of movement of tape 64.

Belt 64 may take a variety of forms and be constructed from a variety of materials. However, in accordance with the invention, the belt is a woven tape formed from a synthetic material such as nylon. Such a tape is described in detail in U.S. Letters Patent No. Re. 25,406, which is incorporated herein by reference to the extent necessary for a complete understanding of one type of belt suitable for use in the practice of the present invention. Further details of such a tape, and a reel on which it is wound, are described in the aforementioned Byrne patents.

The operation of the aircraft launching device is as follows:

With dolly 2 in its battery position as shown in FIG. 1, brake shoes 18 and 36 are disengaged from their respective brake drums 16 and 34, and retract engines 20 and 38 are disengaged. Thus, multiple groove sheaves 14, 15, 32 and 33 are able to free wheel. Piston rod 10 is in an extended position and piston rod 28 is in an inserted position with respect to hydraulic cylinder 30. In this manner, tension is maintained in both linear elements 4 and 6. With turbine engine 54 operating to rotate flywheel 56 and brake shoe 62 disengaged from brake drum 60, clutch 58 is engaged causing reel 48 to turn and belt 64 to coil itself about hub 50.

This causes truck 42 carrying movable sheave 40 to move to the left as shown in FIG. 1, which in turn causes linear element 6 to move in a clockwise direction carrying dolly 2 from its prelaunch or battery position down the runway to a launch position. At the same time, linear element 4 is maintained under tension by sheave 8. Linear element 4 moves around with dolly 2 in a clockwise direction, causing truck 22 carrying movable sheave 21 to move to the left as shown in FIG. 1. During the launch stroke, piston rod 10 moves to its inserted position, and piston rod 28 moves to its extended position, thereby maintaining tension on the linear elements.

FIG. 2 shows dolly 2 approaching its launch position on the runway. At this point in time, clutch 48 is disengaged and brake shoe 62 engages brake drum 60. This causes reel 48 to stop. Since the interconnection between truck 42 and reel 48 is flexible, additional stopping means in the form of brake drum 16 and brake shoe 18 are applied directly to the cable. The slack in element 6 is taken up by movement of piston rod 28 into cylinder 30, this produces tension in element 4 causing piston rod 10 to extend. With the entire system thus brought to rest, dolly 2 is returned to its battery position by engaging retract motor 20 (and optionally retract motor 38) while simultaneously disengaging brake shoe 18 from brake drum 16 and brake shoe 62 from brake drum 60. Thus, during braking of dolly 2, tension of element 4 is relieved by releasing hydraulic pressure from cylinder 12, and permitting piston rod 10 and tensioning sheave 8 connected thereto, to move to the left as shown in FIG. 2. At the same time, hydraulic pressure is applied to hydraulic cylinder 30 in such manner to cause piston rod 28 (previously extended), and tensioning sheave 26 connected thereto, to move to the left as shown in FIG. 2, thus bringing linear element 6 under tension.

The device as shown in the drawings is adapted for bidirectional launching capabilities. In other words aircraft can be launched from right to left as well as from left to right. In order to launch vehicles from right to left, i.e. with the battery position of dolly 2 being at the right as shown in the drawings, it is only necessary to disconnect belt 64 from a truck 42 and connect the belt to truck 21, and utilize brake drum 34 and brake shoe 36 to stop the cable at the end of a launch stroke rather than brake drum 16 and brake shoe 18. Also, in launching vehicles from right to left, retract engine 38 would be used as the principle means for returning dolly 2 to its battery position, with retract engine 20 being used as an optional auxiliary retract engine. Any suitable connection may be provided for attaching tape 64 to either truck 22 or truck 42. Some suitable connections which may be used are those disclosed in U.S. Pats. 3,263,289; 3,264,017; and 3,333,310 to Lagarde.

In a preferred arrangement, reel 48 is positioned substantially midway between the prelaunch and launch positions defined by sheaves 3 and 23. In this manner, only a single reel is necessary to provide bi-directional launching capability by means of selectively connecting tape 64 with either truck 22 or 42. In addition, the length of tape 64 which is necessary to provide a launch capability is substantially reduced by sheaves 21 and 40 which multiply the linear rate of movement of tape 64 so that dolly 2 moves at a multiple of the linear rate of movement of tape 64.

FIGS. 3–5 show one arrangement in which cables 4 and 6 may be trained around multiple groove sheaves or pulleys 14 and 15. In the arrangement shown, cable 4 comes from stationary sheave 9 beneath sheave 14 into groove 70 then is trained up around sheave 15 in groove 72. Cable 4 is then trained around sheaves 14 and 15 by passing successively into grooves 74, 76, 78, 80, 82, 84, and 86. Cable 4 then exits from sheave 14 and cable 86 toward stationary sheave 7 of FIGS. 1 and 2. During a launching operation with tape 64 connected to truck 42 as shown in FIG. 1, trailing cable 4 moves in the direction of the arrows in FIGS. 4 and 5. As shown in FIGS. 1, 2, 3 and 5 upper sheave 15 may be slanted slightly so that its rotational axis is at a small angle with respect to shaft 11 of bottom sheave 14 so that a groove on sheave 15 is aligned with a groove on sheave 14 from which cable 4 exits and is also aligned with a groove on sheave 14 onto which cable 4 enters. That is, as shown in FIG. 5, groove 72 of sheave 15 is aligned at one side with groove 70 of sheave 14 and at its other side with groove 74 of sheave 14. The braking and retract unit for cable 6 is similarly arranged with respect to that for cable 4. When tape 64 is alternatively connected to truck 22 for launching aircraft in a direction from sheave 23 toward sheave 3, cable 4 will move in a direction opposite to that indicated by the arrows in FIGS. 4 and 5.

Cables 4 and 6 are maintained in tight engagement with sheaves 14, 15, 32 and 33 by pretensioning sheaves 8 and 26. In one arrangement, pretensioning sheaves 8 and 26 may simply be connected with springs for biasing sheaves 8 and 26 inwardly toward one another as viewed in FIG. 1. During a launching operation, the tension in cable 6 would cause sheave 26 to move to a position as shown in FIG. 2 and its associated spring would be elongated. The slack created in the system by the extension of sheave 26 and elongation of cable 6 would be taken up by sheave 8 moving to the right under the biasing force of its associated spring. It will also be understood that sheaves 14 and 32 could be driven by retract engines 20 and 38 to return the system to a launch position. In the arrangement shown, retract engine 20 drives sheave 15 counter-clockwise as viewed in FIG. 4 to move dolly 2 back to the position shown in FIG. 1 after it has reached a position as shown in FIG. 2. It will be understood that sheaves 14, 15, 32 and 33 may be rotatable on vertical axis if so desired and that reel 48 may also be rotatable on a vertical axis. In a preferred arrangement, cables 4 and 6 are woven metallic cables of substantially circular cross-section. Such an arrangement also reduces the height which stationary sheaves such as 3 and 23 project above a runway. In order to maintain flexibility of tape 64 and provide adequate strength for extremely heavy aircraft it is necessary to make tape 64 extremely wide. For example, it may be necessary to make tape 64 two feet wide and in a situation where tape 64 is trained out onto the runway it would be necessary to have sheaves 3 and 23 projecting over two feet above the runway. With the present arrangement, it is possible to reduce the height of obstructions while maintaining all the advantages of a tape and reel launching system.

While the invention has been described with reference to a preferred embodiment, it is obvious that modifications and alterations will occur to others upon the reading and understanding of this specification.

Having thus described our invention, we claim:

1. An aircraft launching device for installation at an elongated runway comprising; aircraft towing means movably positioned on said runway for movement longitudinally of said runway between a prelaunch position and a launch position, cable means connected to said towing means, said cable means extending longitudinally of said runway from said prelaunch position to said launch position, sheave means positioned adjacent said runway at said launch position, said cable being trained around said sheave means and extending laterally of said runway, reel means positioned adjacent said runway, an elongated flat fabric tape having one end connected to said reel and its other end connected with said cable adjacent said launch position, said tape extending in a substantially straight line substantially parallel to said runway from said reel to said connection with said cable means, power means for rotating said reel to wrap said tape on said reel in ever-increasing convolutions and move said towing means from said prelaunch position to said launch position, braking means for stopping movement of said towing means at said launch position, reel braking means for stopping rotation of said reel as said towing means reaches said launch position, and retract means for moving said towing means from said launch position to said prelaunch position and for unwrapping said tape from said reel.

2. The device of claim 1 wherein said tape is connected with said cable through movement multiplying means for moving said towing means at a multiple of the linear rate of movement of said tape as said tape is wound upon said reel.

3. The device of claim 1 and including sheave means at said prelaunch position, said cable being trained around said sheave means and extending laterally of said runway, said braking means for stopping movement of said towing means comprising selectively engageable retarding means positioned adjacent said prelaunch position for retarding movement of said cable in a direction from said prelaunch position to said launch position.

4. The device of claim 1 and including sheave means at said prelaunch position, said cable being trained around said sheave means and extending laterally of said runway, said retract means comprising selectively actuatable rewind means positioned adjacent said prelaunch position for moving said cable in a direction from said launch position to said prelaunch position.

5. The device of claim 1 and including sheave means at said prelaunch position, said cable being trained around said sheave means and extending laterally of said runway, said reel being positioned substantially midway between said prelaunch and said launch positions, said tape being selectively connectable with said cable adjacent said prelaunch position or said launch position for selectively moving said towing means to launch aircraft in directions from said prelaunch position to said launch position or from said launch position to said prelaunch position, said braking means for stopping movement of said towing means including selective braking means for stopping movement of said towing means in directions from said launch position to said prelaunch position or from said prelaunch position to said launch position, and said retract means including selective retract means for repositioning said towing means from said launch position to said prelaunch position or from said prelaunch position to said launch position.

6. The device of claim 5 wherein said tape is selectively connectable with said cable adjacent said prelaunch position or said launch position through movement multiplying means for moving said towing means from said prelaunch position to said launch position or from said launch position to said prelaunch position at a multiple of the linear rate of movement of said tape as said tape is wound upon said reel.

7. The device of claim 1 and further including tension compensating means cooperating with said cable for maintaining said cable taut as said cable elongates under tension force during launching and braking periods.

8. The device of claim 1 and including sheave means at said prelaunch position, said cable being trained around said sheave means and extending laterally of said runway, said braking means for stopping movement of said towing means comprising selectively engageable retarding means positioned adjacent said prelaunch position for retarding movement of said cable in a direction from said prelaunch position to said launch position, and said retract means comprising selectively actuatable rewind means positioned adjacent said prelaunch position for moving said cable in a direction from said launch position to said prelaunch position.

9. The device of claim 8 wherein said reel is positioned substantially midway between said prelaunch and launch positions and said tape is selectively connectable with said cable adjacent either said prelaunch or launch positions, said braking means for stopping movement of said towing means including additional selectively engageable retarding means positioned adjacent said launch position for retarding movement of said cable in a direction from said launch to said prelaunch position, and said retract means including additional selectively actuatable rewind means positioned adjacent said launch position for moving said cable in a direction from said prelaunch position to said launch position.

10. The device of claim 9 and further including tension compensating means cooperating with said cable for maintaining said cable taut as said cable elongates under tension force during launching and braking periods.

11. In a runway installed vehicle launching device comprising a dolly operative for movement along said runway from an upstream, battery position, to a downstream, launch position, and thence back to said battery position, a first and a second elongated, flexible linear element, said first element having one end operatively connected to the upstream end of said dolly, said second element having one end operatively connected to the downstream end of said dolly, each of said elements having its respective other end operatively connected to stationary anchoring means, a first movable sheave means having said first linear element reeved thereabout, a second movable sheave means having said second linear element reeved thereabout, means interconnecting said movable sheave means, whereby an incremental linear movement in said sheave means provides twice said incremental linear movement in said dolly, braking means operatively connected to said first linear element to decelerate said dolly as it approaches said launch position, tensioning means operatively connected to said a first and second linear elements to maintain tension therein during movement of said dolly from said battery position to said launch position and during braking of said dolly, retract means operatively connected to said a first and second linear returning said dolly to said battery position, and means operative to linearly move said second movable sheave means comprising a reel having a hub, drive means operative to rotate said reel at its hub, and a belt coilable and uncoilable on said reel, said belt having one end connected to said hub and its other end connected to said second movable sheave means.

References Cited

UNITED STATES PATENTS

| | | | |
|---|---|---|---|
| 2,523,314 | 9/1950 | Maxson et al. | 244—63 |
| 2,872,132 | 2/1959 | Doolittle | 244—63 |
| 3,022,027 | 2/1962 | Keahy | 244—63 |
| 3,446,461 | 5/1969 | Riblett | 244—63 |

FOREIGN PATENTS

| | | |
|---|---|---|
| 949,325 | 2/1949 | France. |
| 825,941 | 12/1959 | Great Britain. |

DUANE A. REGER, Primary Examiner

P. E. SAUBERER, Assistant Examiner

U.S. Cl. X.R.

244—110